United States Patent [19]
Wei

[11] Patent Number: 5,872,817
[45] Date of Patent: Feb. 16, 1999

[54] JOINT VITERBI DECODER AND DECISION FEEDBACK EQUALIZER

[75] Inventor: Lee-Fang Wei, Lincroft, N.J.

[73] Assignee: Lucent Technologies Inc., Murray Hill, N.J.

[21] Appl. No.: 936,649

[22] Filed: Sep. 24, 1997

Related U.S. Application Data

[60] Provisional application No. 60/051,561 Jul. 2, 1997.

[51] Int. Cl.[6] .............................. H04L 27/06; H03D 1/00
[52] U.S. Cl. ....................... 375/341; 375/233; 371/43.4; 371/43.7
[58] Field of Search ..................................... 375/233, 340, 375/341, 348, 262; 371/43.4, 43.7, 43.8

[56] References Cited

U.S. PATENT DOCUMENTS

| | | | |
|---|---|---|---|
| 5,056,117 | 10/1991 | Gitlin et al. .............................. | 375/102 |
| 5,775,855 | 5/1998 | Strolle et al. ............................ | 375/341 |
| 5,787,127 | 7/1998 | Ono et al. ................................ | 375/341 |

OTHER PUBLICATIONS

U.S. application No. 08/753,351 filed Nov. 25, 1996.
U.S. application No. 08/855829 filed May 12, 1997.
P.R. Chevillat et al., "Decoding of Trellis–Encoded Signals in the Presence of Intersymbol Interference and Noise," *IEEE Transactions on Communications*, vol. 37, No. 7, 669–676 (Jul. 1989).

M.V. Eyuboglu et al., "Reduced–State Sequence Estimation for Coded Modulation on Intersymbol Interference Channels," *IEEE Journal on Selected Areas in Communications*, vol. 7, No. 6, 989–995 (Aug. 1989).

A. Duel–Hallen et al., "Delayed Decision–Feedback Sequence Estimation," *IEEE Transactions on Communications*, vol. 37, No. 5, 428–436 (May 1989).

*Primary Examiner*—Temesghen Ghebretinsae
*Attorney, Agent, or Firm*—Ronald D. Slusky

[57] ABSTRACT

Decision feedback equalization is used in a communication system which employs coded modulation, such as trellis coded modulation. The transmitted stream of signal points includes first signal points that were generated using a particular coded modulation scheme interspersed with second signal points that were generated without the using of coding, and estimated intersymbol interference components for the second signal points are generated in response to tentative decisions as to the first signal points formed by the Viterbi decoder. Rather than forming immediate final decisions as to the second signal points, there is formed a tentative decision for each one of the second signal points associated with each Viterbi decoder state using an estimated intersymbol interference component provided from a decision feedback equalizer associated with that state. Each second-signal-point tentative decision is used to extend the surviving path for the associated state and to also update its path metric.

9 Claims, 6 Drawing Sheets

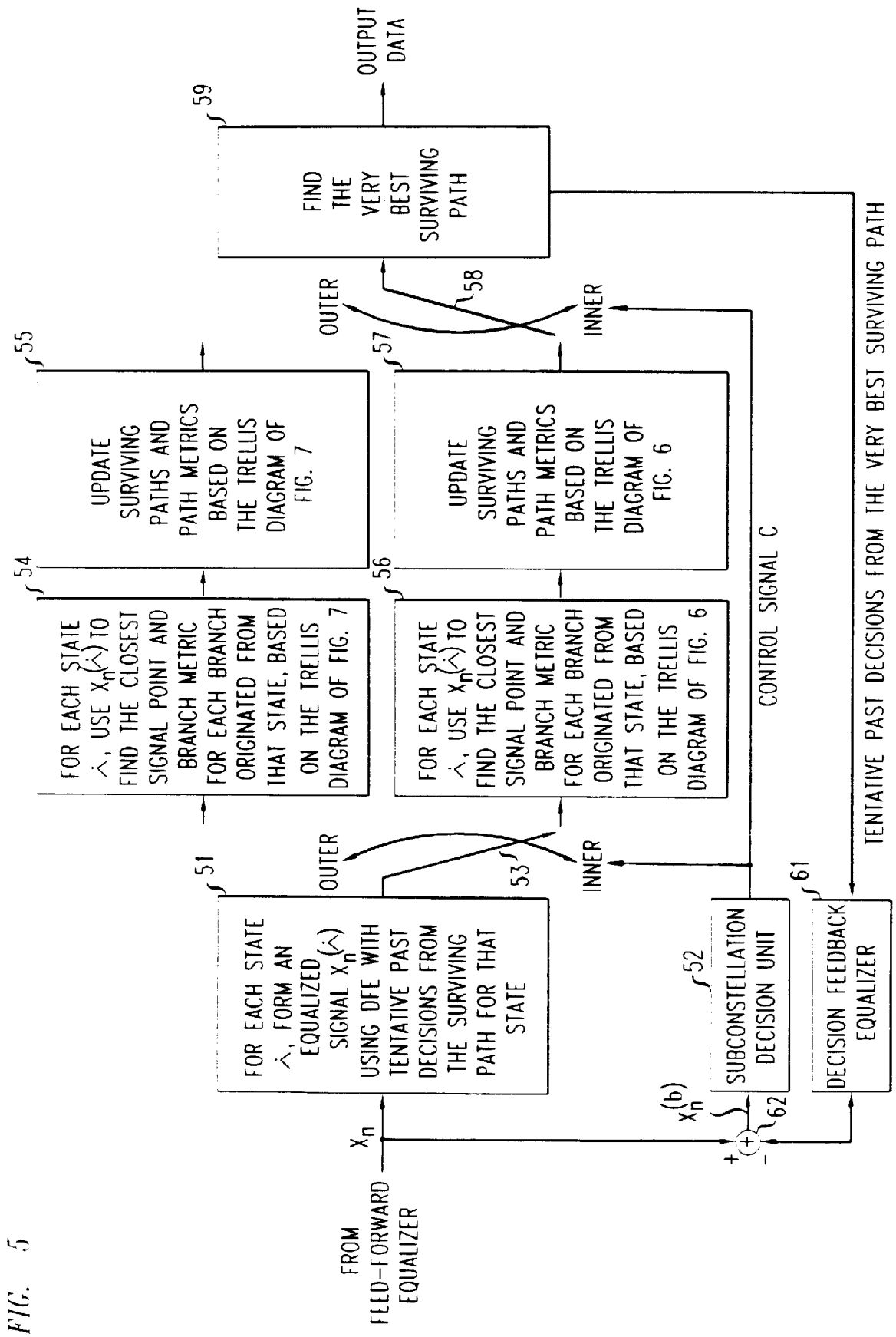

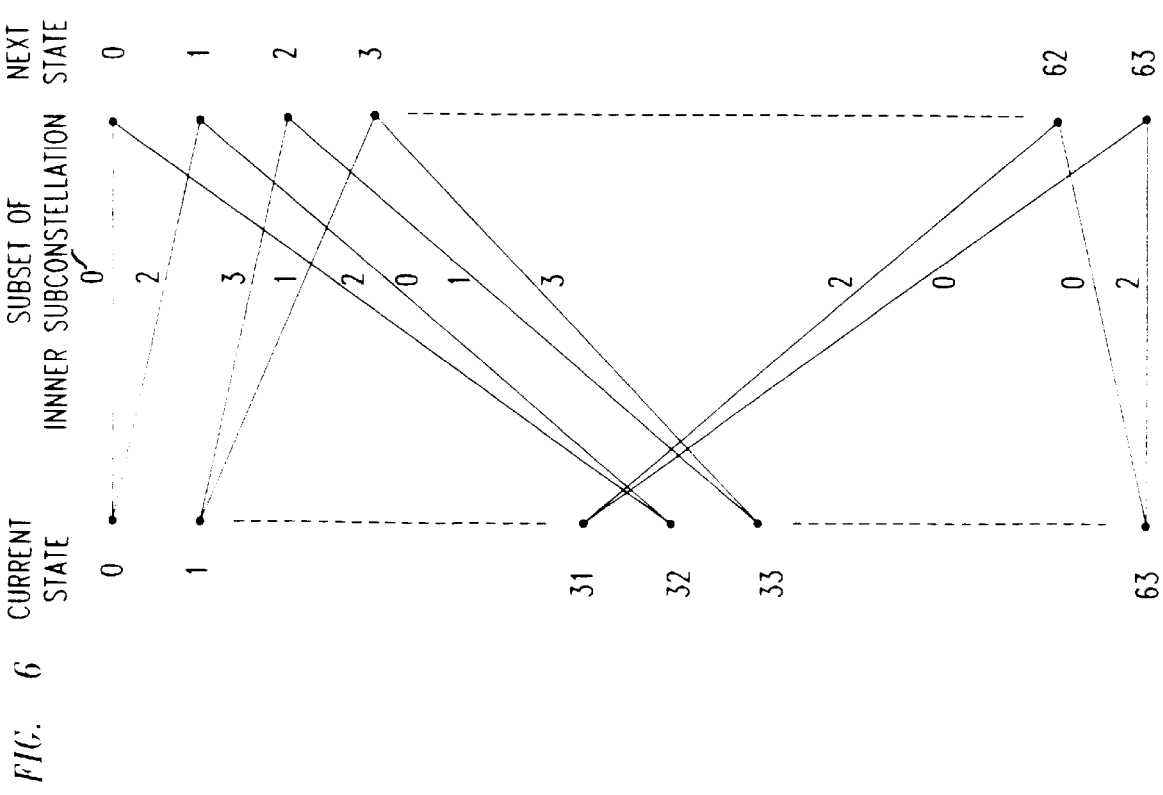

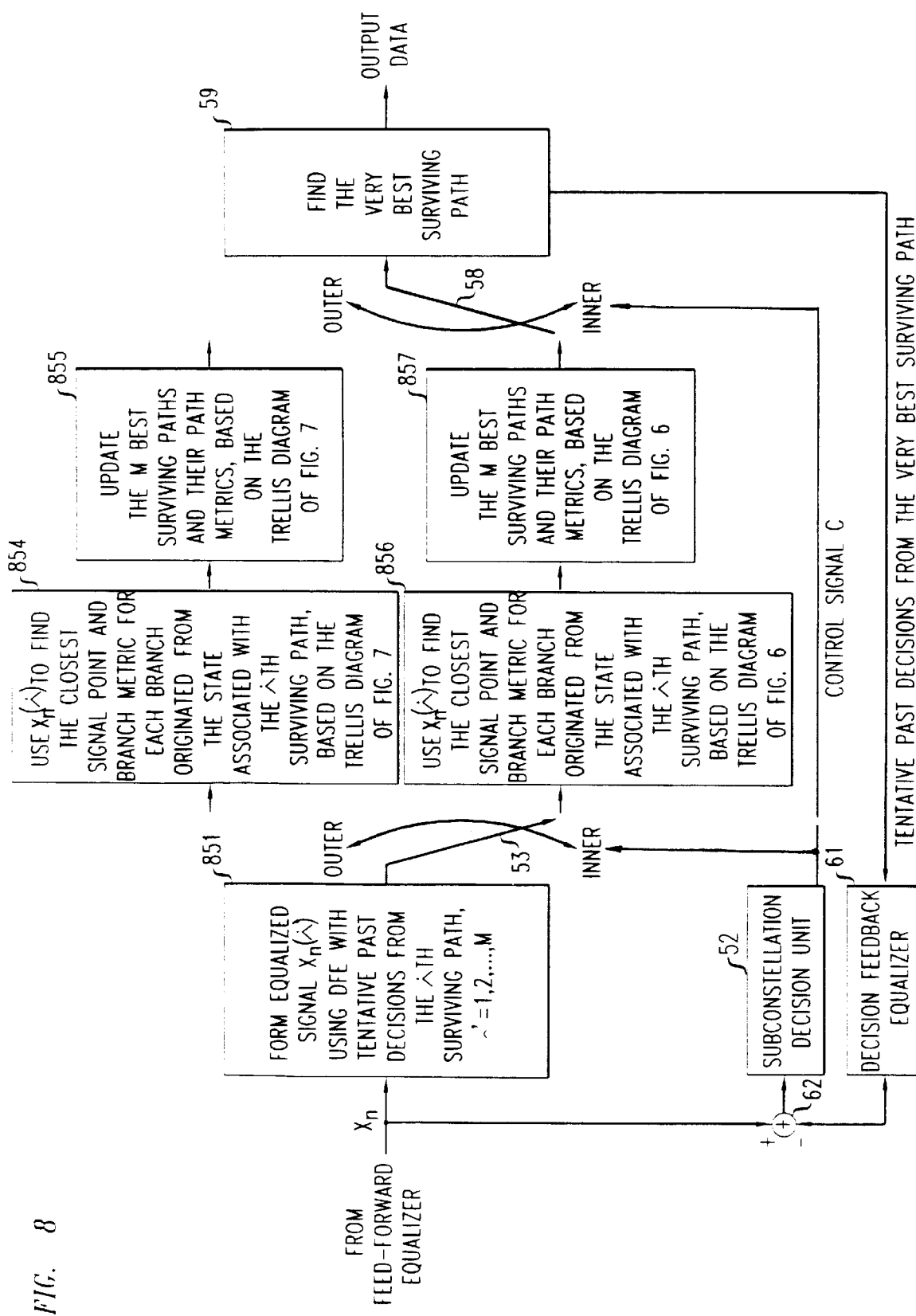

JOINT VITERBI DECODER AND DECISION FEEDBACK EQUALIZER

This application claims priority of Provisional Application Ser. No. 60/051,561 which was filed on Jul. 2, 1997.

BACKGROUND OF THE INVENTION

The present invention relates to the use of decision feedback equalization in communication systems which employ coded modulation.

Decision feedback equalization is a preferred technique for compensating for intersymbol interference, or ISI, engendered in certain kinds of transmission channels. In a traditional decision feedback equalization arrangement, an estimate of the ISI component of a received signal representing a transmitted signal point is subtracted from the received signal prior to a decision being made as to which signal point was transmitted. The estimate is generated as a function of a plurality of previous decisions—typically, as a linear combination of same.

Using decision feedback equalization in a communication system which employs coded modulation, such as trellis coded modulation, gives rise to at least one difficulty. Specifically, the process of decoding the transmitted signal points involves a delay of many signaling intervals due to the use of maximum likelihood decoding in, for example, the Viterbi decoder that is typically used. However, the decision feedback equalizer, or DFE, requires immediate past decisions in order to estimate the ISI component. U.S. Pat. No. 5,056,117 issued to Gitlin et al. on Oct. 8, 1991 discloses a joint Viterbi decoder/DFE arrangement which addresses this problem by providing a separate DFE for each state of the Viterbi decoder. The tentative signal point decisions along the surviving path of each state are used in the associated DFE to generate an equalized signal for use in calculating the so-called branch metrics for trellis branches emanating from the state in question.

SUMMARY OF THE INVENTION

The present invention is directed to a further enhancement of this approach in the context of systems which use both coded modulation and decision feedback equalization. In certain applications, the received stream of transmitted signal points includes first signal points that were generated using a particular coded modulation scheme interspersed with second signal points that were generated in some other way. One particular such application is the probabilistic trellis coded modulation scheme of the type disclosed in my co-pending United States patent applications Ser. No. 08/753,351 filed Nov. 25, 1996 and Ser. No. 08/855,829 filed May 12, 1997, both hereby incorporated by reference. The invention is directed to an advantageous decoder/DFE, i.e. joint Viterbi decoder and DFE, for use in such an environment and, in particular, in accordance with the invention, estimated ISI components for the second signal points are generated in response to tentative decisions as to the first signal points formed by the Viterbi decoder.

In particular embodiments of the invention, the signal points along the so-called very best surviving path within the Viterbi decoder could be used as the past decisions that are input to a DFE used to form the estimated ISI component for one of the second—illustratively uncoded—signal points and an immediate final decision as to the transmitted signal point could then be made. That decision would also be applied to whatever DFEs are employed in the system (such as the per-state DFEs mentioned above) and used over a number of subsequent signaling intervals to represent the value of the uncoded signal point in question.

Preferred more powerful, implementations of the invention, however, form not an immediate final decision as to the second—again, illustratively uncoded—signal points but, rather form a tentative decision associated with each Viterbi decoder state using an estimated ISI component provided from a DFE associated with that state. Each second-signal-point tentative decision is used to extend the surviving path for the associated state and, in preferred embodiments, to also update its path metric.

An alternative implementation of the invention is to retain in the above joint decoder/DFE only the surviving paths that are associated with a reduced number, M, of states which have the smaller path metrics, and to use a separate DFE for each of those M states.

Yet another alternative implementation of the invention is to retain in the joint decoder/DFE some number, M, of the surviving paths which have the smallest path metrics, even if two or more of those paths may come into a given state. For each surviving path, an equalized signal is formed using a DFE the inputs of which are the tentative past decisions from that path, the equalized signal then being used to extend that path and to update its path metric.

BRIEF DESCRIPTION OF THE DRAWING

FIG. 5 is a combined block diagram/functional description view of the decoder/DFE of FIGS. 1 and 3 tailored for specific coded modulation;

FIG. 6 is a state transition diagram illustratively used in the just mentioned specific coded modulation vis-a-vis coded signal points;

FIG. 7 is a state transition diagram used in the just mentioned specific coded modulation vis-a-vis uncoded signal points; and FIG. 8 is similar to FIG. 5 but modified so as to implement my path-oriented, as opposed to state-oriented, approach to selecting surviving paths.

DETAILED DESCRIPTION

Figure 1:
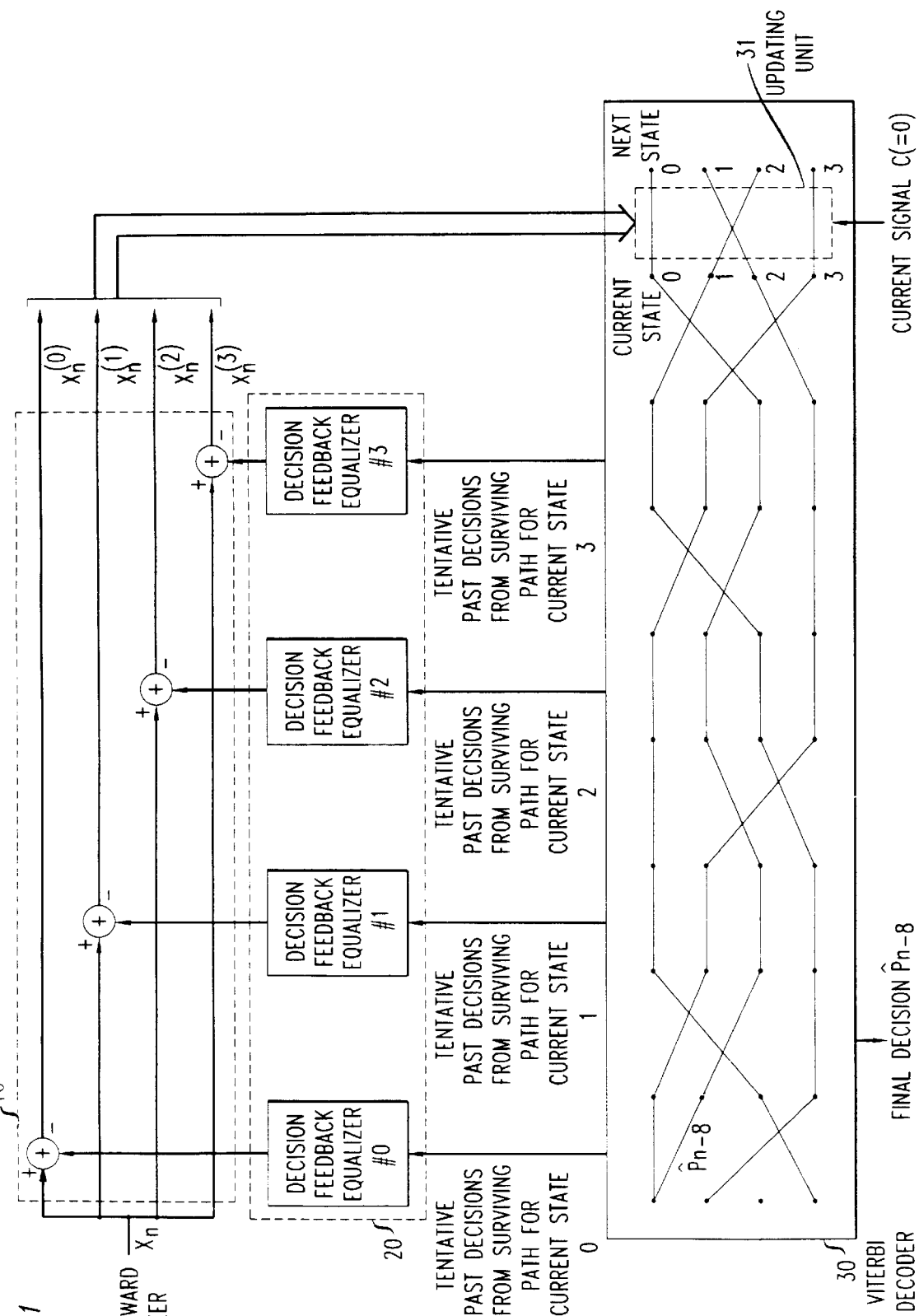
FIG. 1 provides a functional view, at a particular point in time, of a joint decoder/DFE embodying the principles of the present invention.

The decoder/DFE of FIG. 1 is illustratively part of a receiving modem in which a signal $x_n$, representing a transmitted signal point, is generated for the $n^{th}$ of a succession of signaling intervals. Signal $x_n$ was illustratively generated within the modem using conventional front-end steps such as sampling of an incoming line signal received from a telephone channel, demodulation and possibly feed-forward equalization. Four replicas of $x_n$ are formed and a respective estimated intersymbol interference, or ISI, component is subtracted from each replica by a respective one of adders 10, to produce equalized signals $x_n^{(0)}$ through $x_n^{(3)}$. The ISI components are provided by respective ones of decision feedback equalizers 20, as described below.

The transmitted signal points represented by the $x_n$'s were generated in a transmit modem which used illustratively a probabilistic trellis coded modulation scheme of the type disclosed in my above-cited co-pending '351 and '829 patent applications. For purposes of illustration herein, it is assumed that the transmitter uses a four-state code which is why four replicas of $x_n$ are formed, as will become apparent as this description continues. In particular embodiments, however, other codes may be preferred, such as the 64-state code shown in those patent applications.

Viterbi decoder 30 of the decoder/DFE receives the equalized signals $x_n^{(0)}$ through $x_n^{(3)}$ and provides a so-called final decision $\hat{P}_{n-8}$ associated with the earlier signal $x_{n-8}$. The notation here indicates that the final decision that is output by Viterbi decoder 30 as to the value of a particular $x_n$ is delayed by, in this example, 8 signaling intervals, this corresponding to the so-called decoding depth of the Viterbi decoder. The decoding depth of 8 is used herein for purposes of illustration. In actual practice, the decoding depth depends on the code that is being used and will typically be greater than 8.

The representation of Viterbi decoder 30 in FIG. 1 includes a representation of the so-called trellis—made up of concatentations of the trellis code's state transition diagram, as described below—and further shows the so-called surviving paths extending through the trellis, each surviving path being associated with, and terminating on, one of the four states of the code, those states being denominated 0, 1, 2 and 3. As is well known, the coder in the transmit modem proceeds through a sequence of states which, in turn, defines a unique sequence of signal point subsets of a signal constellation. The coder output is a sequence of signal points each selected from a respective subset of the subset sequence thus defined. The task of the Viterbi decoder is to determine what the most likely sequence of signal points actually was, and central to that task is to determine the most likely sequence of transmitted signal points leading into each state of the code at any point in time. These are the aforementioned surviving paths, and the signal points along each path constitute a sequence of tentative signal point decisions. A metric is maintained for each surviving path, and, as described below, the current equalized signals $x_n^{(0)}$ through $x_n^{(3)}$ are used to determine new surviving paths having updated path metrics. A final decision is thereupon made as to the value of one of the transmitted signal points-specifically one that was transmitted (in this case) 8 signaling intervals earlier. In particular, in preferred Viterbi decoder implementations, the path having the smallest metric at this time—called the very best surviving path—is identified. The signal point on that path 8 signaling intervals earlier is taken as the final signal point decision.

Each of DFEs 20 is associated with a particular one of the code states 0, 1,2 and 3. In particular, each DFE generates its respective ISI estimate as a function of the tentative signal point decisions which lie along the surviving path leading to the code state associated with that DFE. At this time, the ensemble of tentative signal point decisions along each newly determined surviving path are applied to the associated DFE in preparation for the generation of next set of ISI estimates to be applied to adders 10. In particular, as is well known, a DFE forms its ISI estimate by forming a combination (illustratively a linear combination) of the decisions that have been input to it using an ensemble of coefficients whose values may be adaptively updated. Thus it will be seen that each of the equalized signals $x_n^{(0)}$ through $x_n^{(3)}$ is associated with a particular state of the code in that the ISI estimate that was used to form that equalized signal was generated as a function of the then surviving path leading to the state in question.

Figure 2:
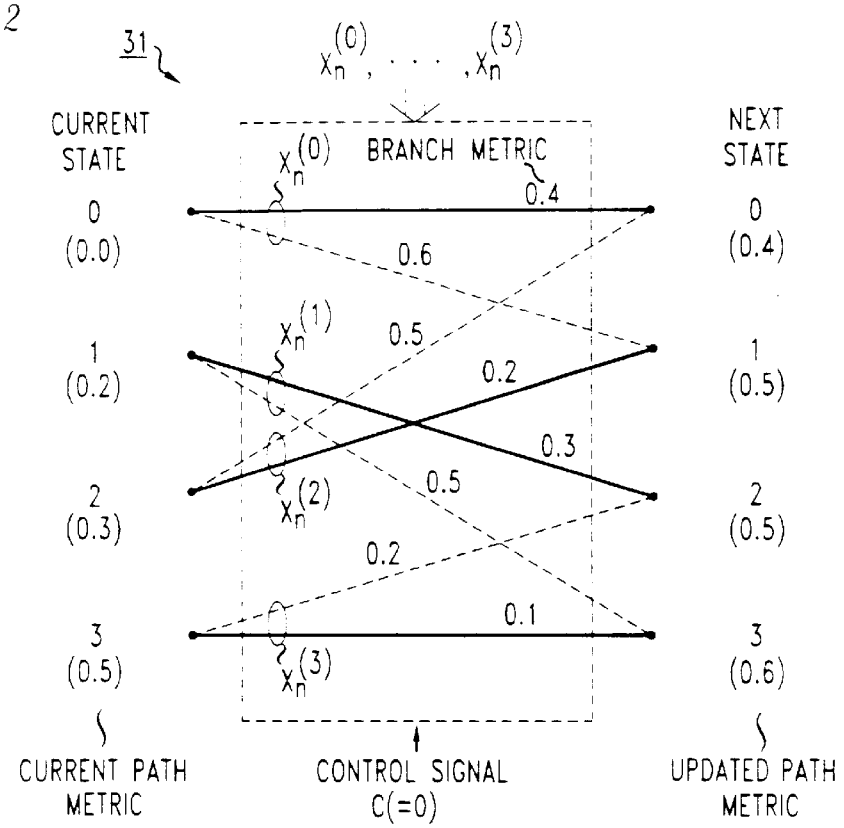
FIG. 2 is a state transition diagram illustratively used in the decoder/DFE of FIG. 1 vis-a-vis coded signal points.

The process by which, as mentioned above, the current equalized signals $x_n^{(0)}$ through $x_n^{(3)}$ are used to determine new surviving paths having updated path metrics is carried out by updating unit 31 within Viterbi decoder 30. Reference may be made to FIG. 2. Associated with the code in question is a so-called state transition diagram which defines, for each current code state, which next state or states the coder is allowed to transition to. Thus, as shown by the solid and dashed lines within updating unit 31, the code can transition from current state 0 to either next state 0 or next state 1; from current state 1 to either next state 2 or next state 3; from current state 2 to either next state 0 or next state 1; and from current state 3 to either next state 2 or next state 3. Each such transition is associated with one of the aforementioned constellation subsets, meaning that when the encoder transitions from a particular current state to one of the allowed next states, a signal point will be output by the transmitter which is taken from the subset associated with that state transition. A so-called branch metric is calculated for each of the (in this case) eight current-to-next-state transitions defined by the state transition diagram. The branch metric for each transition is given by the squared Euclidean distance between one of the equalized signals $x_n^{(0)}$ through $x_n^{(3)}$ and the closest signal point in the subset associated with that transition. That distance is typically referred to as being the distance between the equalized signal and the associated subset. As shown in FIG. 2 illustrative values of the eight branch metrics are 0.4, 0.6, 0.3, 0.5, 0.5, 0.2, 0.2 and 0.1. The particular one of the equalized signals $x_n^{(0)}$ through $x_n^{(3)}$ that is used to calculate any given one of the branch metrics is the equalized signal associated with the state from which that branch emanates. Thus as shown in the FIG., equalized signal $x_n^{(0)}$ is used in calculating the branch metrics for the branches between current state 0 and next states 0 and 1; $x_n^{(1)}$ is used in calculating the branch metrics for the branches between current state 1 and next states 2 and 3; $x_n^{(2)}$ is used in calculating the branch metrics for the branches between current state 2 and next states 0 and 1; and $x_n^{(3)}$ is used in calculating the branch metrics for the branches between current state 3 and next states 2 and 3. There are eight candidate paths at this point, two leading into each of the four next states. Each candidate path has an associated metric given by the sum of the current path metric of the corresponding current state and the branch metric of the corresponding branch, the four current path metrics illustratively being 0.0, 0.2, 0.3 and 0.5. The one of those two candidate paths having the smaller path metric is declared the new surviving path for that state and the corresponding path metric becomes the new path metric for that state. For example, the candidate paths leading into next state 0 from current states 0 and 2 have metrics of 0.4 (0.0+0.4) and 0.8 (0.3+0.5), respectively, so that the former becomes the surviving path into next state 0 . The branches shown in solid line within updating unit 31 are the branches of the new surviving paths. (As is well known, normalization or other techniques may be used at this point to prevent the values of the path metrics from becoming so large as to possibly cause register overflow. However, the new path metrics shown in FIG. 2 are the pre-normalized values.) At this point the very best surviving path is that leading into state 0 , it being the path with the smallest new path metric. The aforementioned final decision $\hat{P}_{n-8}$ is now output, it being the signal point on that very best surviving path from 8 signaling intervals earlier.

The preceding discussion has proceeded on the tacit assumption that each successive transmitted signal point is generated upon the occurrence of an advance in the state of the transmit encoder. However, in some applications this may not be the case, such as in the probabilistic TCM technique disclosed in my aforementioned co-pending patent applications. That is, a signal point may be transmitted without the transmit encoder state advancing. In the embodiments disclosed in those patent applications, such signal points are selected from an uncoded "outer" sub-constellation and are thus referred to herein as "uncoded signal points."

The present invention is directed to a joint decoder/DFE which is designed to provide accurate ISI estimates in such an environment, and in accordance with the invention, ISI estimates for the uncoded signal points are generated in response to tentative decisions as to the coded signal points as formed by the Viterbi decoder.

In particular embodiments of the invention, the signal points along the very best surviving path within the Viterbi decoder can be used as the past decisions input to a DFE used to form the ISI estimate for one of the uncoded signal points and an immediate final decision as to the uncoded signal point can be made. That decision would also be applied to whatever DFEs are employed in the system (such as the per-state DFEs mentioned above) and used over a number of subsequent signaling intervals to represent the value of the uncoded signal point in question.

Figure 3:
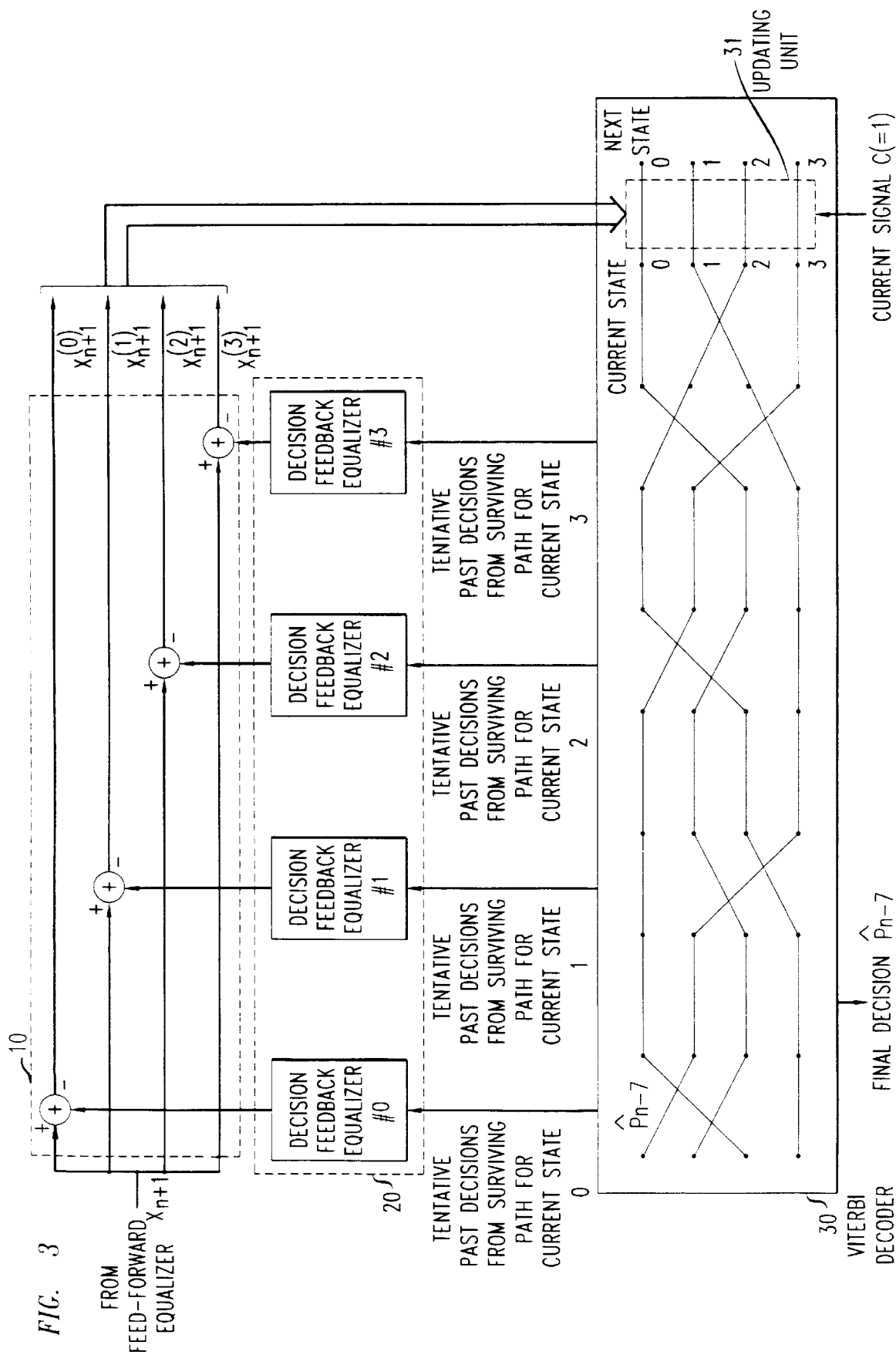
FIG. 3 shows the joint decoder/DFE of FIG. 1 at a subsequent point in time.

A more powerful, and preferred, implementation of the invention, however, is as shown in FIG. 3. In this implementation we do not form an immediate final decision as to the uncoded signal points but, rather, a tentative decision associated with each Viterbi decoder state using an ISI estimate provided from a DFE associated with that state. Each uncoded signal point tentative decision is used to extend the surviving path for the associated state and, in preferred embodiments, to also update its path metric.

This approach is illustratively implemented by the decoder/DFE structure of FIG. 3 in the $(n+1)^{st}$ signal interval. That is, it is assumed that the transmitted signal point in the $(n+1)^{st}$ signaling interval was one of the uncoded signal points. FIG. 3 is similar to FIG. 1, except that since the received signal $x_{n+1}$ represents an uncoded signal point, the state transition diagram used in updating unit 31 is that shown in FIG. 4. In particular, since the transmit coder state does not advance when an uncoded signal point is generated, the state transition diagram used by updating unit 31 for uncoded signal points simply comprises four parallel branches, each extending from the current state to the same next state, i.e., current state 0 to next state 0 , current state 1 to next state 1 , and so forth. As described in further detail hereinbelow, a decision is made as soon as each signal is received as to whether it represents a coded or uncoded signal point. The value of a one-bit control signal C indicates the result of that decision—C=0(1) for a coded (uncoded) signal point C is used by updating unit 31 to determine which state transition diagram is to be used—that of FIG. 2 for coded signal points or that of FIG. 4 for uncoded signal points. Thus C=1 for the illustrative $(n+1)^{st}$ signaling interval represented by FIG. 3.

Figure 4:
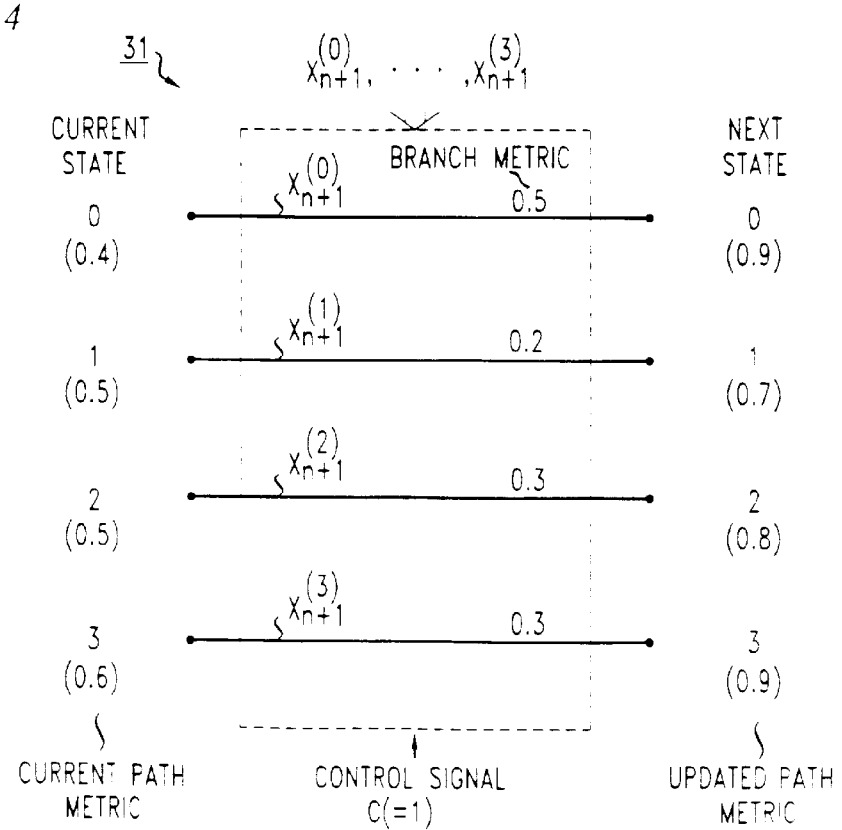
FIG. 4 is a state transition diagram illustratively used in the decoder/DFE vis-a-vis uncoded signal points.

Once it is recognized that the state transition diagram of FIG. 4 is to be used at this time for purposes of updating the path metrics and finding the surviving paths, the overall operation is essentially the same as before. Each one of equalized signals $x_{n+1}^{(0)}$ through $x_{n+1}^{(3)}$ is used to calculate a respective one of the four branch metrics—given by the squared Euclidian distance between that equalized signal and the closest encoded signal point of the transmit constellation. The four branch metrics are illustratively 0.5, 0.2, 0.3 and 0.3. The current path metrics 0.4, 0.5, 0.5 and 0.6— which will be recognized as being the updated path metrics of FIG. 2—are themselves updated to provide new updated path metrics 0.9, 0.7, 0.8 and 0.9. Since only one path extends into each new state, each new surviving path is simply an extended version of the surviving path previously extending into that state. Also as before, the very best surviving path is identified-now it is the path leading into state 1—and a final decision $\hat{P}_{n-7}$ is output, it being the signal point along that very best surviving path from 7 signaling intervals earlier.

FIG. 5 provides a combined block diagram/functional description view of the decoder/DFE of FIGS. 1 and 3 tailored for probablistic trellis-coded modulation of the type described in the above-cited patent applications. As such, the coded signal points are the signal points of the so-called inner sub-constellation of the overall signal constellation and the uncoded signal points are the signal points of the so-called outer sub-constellation of the overall signal constellation. Illustratively the code used is that implemented by the coder shown in FIG. 5 of my above-cited '829 patent application. The state transition diagram for that code is shown in the present FIG. 6, in which the branches are labeled with their associated inner sub-constellation subsets 0, 1, 2 and 3, corresponding to the bit pair values (0,0), (0,1), (1,0) and (1,1) for the bit pair (X1, X0) shown in the various appendices of the '351 and '829 patent application as well as the appendices hereof. In addition, the structure of the transmitter is that shown in FIG. 6 of the '829 application and the constellation is that shown in Appendix II thereof.

Looking then at FIG. 5, the received signal $x_n$ is processed at block 51 to produce an equalized signal associated with each state of the code. As indicated in the FIG., the functionality of this block is that for each state, i, of the code, an equalized signal $x_n^{(i)}$ is formed using a DFE whose inputs are the tentative past decisions along the surviving path associated with the $i^{th}$ state.

A signal indicative of whether the received signal represents a coded, inner sub-constellation, signal point or an uncoded, outer sub-constellation signal point is provided by sub-constellation decision block 52 in a manner to be described. That signal corresponds to one-bit control signal C in FIGS. 1 and 3.

Assuming that the received signal has been determined to represent a coded, inner sub-constellation signal point, switch 53 is in the "down" position and the equalized signals are processed at block 56. As indicated in the FIG., the functionality of this block is that for each state, i, of the code, we use $x_n^{(i)}$ to find a) the closest signal point in the subset associated with each branch and b) the branch metric for each branch emanating from that state based on the state transition diagram of FIG. 6. Then, at block 57, the path metrics and the surviving paths are updated based on the same state transitiondiagram. Switch 58 will be in the "down" position at this time so that the flow proceeds to block 59 at which the very best surviving path is found and a final output decision is made.

If, on the other hand, the received signal has been determined to represent an uncoded, outer sub-constellation signal point, switch 53 is in the "up" position and the equalized signals are processed at block 54. The functionality of this block is essentially similar to that of block 56 except that the state transition diagram is that shown in FIG. 7. As with the state transition diagram of FIG. 4, the state transition diagram of FIG. 7 comprises a single branch emanating from each current state and extending to the same next state. Each branch is associated with the entire outer sub-constellation. Thus, as indicated in the FIG., the functionality of this block is that for each state, i, of the code, we use $x_n^{(i)}$ to find a) the closest outer sub-constellation signal point and b) the branch metric for the branch emanating from that state. Then, at block 55, the path metric is updated and the surviving path is extended, as noted earler. Switch 58 will be in the "up" position at this time so that the flow proceeds to block 59 at which, as before, the very best surviving path is found and a final output decision is made.

A decision as to whether signal $x_n$ represents an inner or outer sub-constellation signal point would be most accurately made if one were to wait for the Viterbi decoder to provide a final decision as to that signal. However, that decision must be made at sub-constellation decision block 52 soon as the signal is received. One can, however, use at least a portion of what it has already "learned" by the Viterbi decoder to aid in making that decision. In particular, as indicated in the FIG., a combining step 62 and a decision feedback equalization block 61 are used to form an equalized signal $x_n^{(b)}$ at the time signal $x_n$ is received, the inputs of block 61 being the tentative past decisions from the very best surviving path of the Viterbi decoder. Based on whether signal $x_n^{(b)}$ falls into the region of the inner or outer subconstellation, subconstellation decision block 52 makes the inner or outer subconstellation decision. Since the ISI estimate is based on an assumed sequence of past signal points that may turn out to be not wholly correct, and since the decision as to whether the received signal is from the inner or outer sub-constellation is crucial to the performance of the overall system, it may be desired to provide some additional protection against making an error as to the sub-constellation. To this end, the constellation may be designed in such a way that the distance between its inner and outer sub-constellations is greater than would be otherwise dictated by other design criteria, e.g., greater than the effective minimum distance of the overall modulation scheme. Such a constellation is shown in Appendix I hereof, this constellation being very similar to that shown in Appendix II of the '829 application except that the distance between the inner and outer sub-constellations has been increased from 16 to 32.

In applications where bit robbing (as described in the '829 application) may occur, the constellation shown in Appendix III of the '829 application may be used for the bit-robbed signaling intervals. In the context of FIG. 5 hereof, a bit robbing indicator indicating the occurrence of a bit-robbed signaling interval would be applied at blocks 52, 54 and 56, causing the use of that constellation at those blocks. If desired, in order to provide greater reliability for the inner/outer sub-constellation decision for the bit-robbed intervals, the constellation shown in Appendix II hereof may be used instead, it having a distance between the inner and outer sub-constellations of 44, as compared to 16 for the constellation shown in Appendix III of the '829 application.

A further consideration relative to bit robbing is as follows: On the one hand, although a transmitted signal point can be received as another signal point due to bit robbing, both of those signal points map back into the same transmitted bit pattern so from that standpoint there is no problem, as discussed in my '829 application. A potential problem arises, however, in that the decision as to the amplitude of the signal point is fed back to the DFE and it is possible that, due to noise and impairments between the receiving central office and the receiving modem, the signal point that was transmitted from the central office to the receiving modem may become so displaced that an incorrect decision is made in the receiving modem as to which of the two signal points was sent. The presence of this incorrect decision in the DFE will have a negative effect on the accuracy of the decoding process.

There are at least two ways to deal with this situation. One of them is to design the constellation in such a way that the distance between each pair of signal points that become one another due to bit robbing is at least the same as the effective minimum distance of the overall modulation scheme. By following this approach, one would ensure that any errors that occur in making decisions between the points in the same pair will not become the dominating errors in terms of the overall performance. The constellation shown in Appendix III, which could be used for the bit-robbed intervals, follows this approach. It may be observed, first of all, that the distance between each pair of points is at least 16, which is greater than the effective minimum distance "15" of the overall modulation scheme using the constellation of Appendix I for the non-bit robbed intervals. It may also be observed that the constellation of Appendix III is comprised solely of an outer sub-constellation whose smallest magnitude signal points are ±247.5. No signal points of smaller amplitude can be used because below the magnitude of 247.5, the distance between each pair of signal points is less than 15, thereby violating the desired design constraint. Moreover, since the minimum distance of 16 between different pairs of signal points of the constellation of Appendix III is already greater than the effective minimum distance of the overall modulation scheme, there would be no benefit to using coding to that constellation. It may be noted that the number of signal point pairs in this constellation is 30. As a consequence, this approach will support one less bit during the bit-robbed intervals than for the case of Appendix II. The choice between the use of the constellations of Appendices II and III will be made based on whether one is willing to endure the lower level of error rate performance provided by the constellation of Appendix II in order to have a higher bandwidth efficiency.

The other approach is to design the constellation in such a way that the distance between each pair of points that become one another due to bit robbing is much smaller than the effective minimum distance of the overall modulation scheme, so that an error made in the receiver as to which one was transmitted will have a negligible effect on the decoder/DFE performance. In fact, one can use both of these approaches together, for example, having an inner, coded sub-constellation wherein each pair of signal points are very close together and an uncoded outer sub-constellation wherein each pair of signal points are very far apart, as just described.

The above-described methodology used in the Viterbi decoder to select surviving paths follows a conventional, state-oriented, approach wherein, as will be recalled, the path having the smallest path metric among all paths coming into a given state is retained as a surviving path. This approach is indeed the most desirable approach when dealing with Gaussian channels.

I have discovered, however, an alternative approach that is more advantageous for, for example, channels engendering a significant amount of intersymbol interference. In accordance with that approach, referred to herein as a "path-oriented" approach—the paths that are retained as the surviving paths are some number, M, of the paths which have the smallest path metrics, even if two or more of those paths may come into a given state. I have discovered that this path-oriented approach will achieve substantially the same (or only negligibly worse) level of performance as the state-oriented approach with a much reduced level of decoder complexity. For example, using a 64—state code, one can use M=16—that is, retaining only the 16 best paths—and achieve essentially the same performance as the much more complex state-oriented approach in which 64 paths—one for each state—are retained. Moreover, in at least one case, I have observed that the simpler path-oriented approach can even outperform the state-oriented approach.

It is known that in order to reduce decoder complexity one can use a reduced-state state-oriented approach in which the surviving paths leading into only a reduced number of states are retained, those being the states having the smaller path metrics. For a given code, the complexity of a reduced state scheme which retains the paths leading into M states is comparable to the complexity of my path-oriented approach retaining the M best paths. However, as between two such more-or-less equally complex approaches, it appears that the performance of the path-oriented approach will almost always be at least as good and, in some cases, will be much better.

FIG. 8 shows the implementation of my path-oriented approach for joint decoder/DFE in the present context of probablistic TCM. More particularly, various elements shown in FIG. 8 correspond, either exactly, or with modifications, to those shown in FIG. 5. Those that correspond exactly bear the same reference numeral, whereas blocks 51, 54, 55, 56 and 57 are replaced in FIG. 8 with blocks 851, 854, 855, 856 and 857.

In blocks 851, 854 and 856 the calculations that are carried out vis-a-vis the equalized signal $x_n^{(i)}$ are carried out for each M best surviving paths rather than for each state of the code. And in blocks 855 and 857 a new set of M best surviving paths are identified, along with their associated path metrics, rather than, as in FIG. 5, identifying an updated surviving path, and its associated metric, for each state.

The foregoing is merely illustrative. Thus, for example, it will be appreciated by those skilled in the art that the block diagrams herein represent conceptual views of illustrative circuitry embodying the principles of the invention. The functions of the various elements shown in the FIGS. would, in preferred embodiments, be implemented by one or more programmed processors, digital signal processing (DSP) chips, or the like rather than individual hardware elements. Similarly, the switches shown in the FIGS. are conceptual only. Their function would typically be carried out through the operation of program logic.

In the claims hereof any element expressed as a means for performing a specified function is intended to encompass any way of performing that function including, for example, a) a combination of circuit elements which performs that function or b) software in any form (including, therefore, firmware, microcode or the like) combined with appropriate circuitry for executing that software to perform the function. The invention is defined by such claims resides in the fact that the functionalities provided by the various recited means are combined and brought together in the manner which the claims call for. Applicant thus regards any means which can provide those functionalities as equivalent as those shown herein.

It will be appreciated by those skilled in the art that they will be able devise various arrangements which, although not explicitly shown or described herein, embody the principles of the invention and thus are within its spirit and scope.

L. F. Wei 41

| I8 | I7 | I6 | I5 | I4 | I3 | I2 | X1 | X0 | Amplitude of Signal Point | |
|---|---|---|---|---|---|---|---|---|---|---|
| 1 | 1 | 0 | 0 | 0 | 0 | 0 | 0 | – | 1,487.5 | |
| 1 | 1 | 0 | 0 | 0 | 0 | 0 | 1 | – | 1,423.5 | |
| 1 | 1 | 0 | 0 | 0 | 1 | 0 | 1 | – | 1,359.5 | |
| 1 | 1 | 0 | 0 | 0 | 1 | 0 | 0 | – | 1,295.5 | |
| 1 | 0 | 1 | 0 | 0 | 1 | 0 | 0 | – | 1,231.5 | |
| 1 | 0 | 1 | 0 | 0 | 1 | 0 | 1 | – | 1,167.5 | |
| 1 | 0 | 1 | 0 | 0 | 0 | 0 | 1 | – | 1,103.5 | |
| 1 | 0 | 1 | 0 | 0 | 0 | 0 | 0 | – | 1,039.5 | |
| 1 | 0 | 0 | 0 | 0 | 0 | 0 | 0 | – | 991.5 | |
| 1 | 0 | 0 | 0 | 0 | 0 | 0 | 1 | – | 959.5 | |
| 1 | 0 | 0 | 0 | 0 | 1 | 0 | 1 | – | 927.5 | |
| 1 | 0 | 0 | 0 | 0 | 1 | 0 | 0 | – | 895.5 | |
| 0 | 1 | 0 | 0 | 0 | 1 | 0 | 0 | – | 863.5 | |
| 0 | 1 | 0 | 0 | 0 | 1 | 0 | 1 | – | 831.5 | |
| 0 | 1 | 0 | 0 | 0 | 0 | 0 | 1 | – | 799.5 | |
| 0 | 1 | 0 | 0 | 0 | 0 | 0 | 0 | – | 767.5 | Positive Portion of |
| 0 | 1 | 0 | 0 | 1 | 0 | 0 | 0 | – | 735.5 | Uncoded 76-PAM |
| 0 | 1 | 0 | 0 | 1 | 0 | 0 | 1 | – | 703.5 | Outer Subconstellation |
| 0 | 1 | 0 | 0 | 1 | 1 | 0 | 1 | – | 671.5 | |
| 0 | 1 | 0 | 0 | 1 | 1 | 0 | 0 | – | 639.5 | |
| 0 | 1 | 0 | 1 | 1 | 1 | 0 | 0 | – | 607.5 | |
| 0 | 1 | 0 | 1 | 1 | 1 | 0 | 1 | – | 575.5 | |
| 0 | 1 | 0 | 1 | 1 | 0 | 0 | 1 | – | 543.5 | |
| 0 | 1 | 0 | 1 | 1 | 0 | 0 | 0 | – | 511.5 | |
| 0 | 1 | 0 | 1 | 0 | 0 | 0 | 0 | – | 487.5 | |
| 0 | 1 | 0 | 1 | 0 | 0 | 0 | 1 | – | 471.5 | |
| 0 | 1 | 0 | 1 | 0 | 1 | 0 | 1 | – | 455.5 | |
| 0 | 1 | 0 | 1 | 0 | 1 | 0 | 0 | – | 439.5 | |
| 0 | 0 | 1 | 1 | 0 | 1 | 0 | 0 | – | 423.5 | |
| 0 | 0 | 1 | 1 | 0 | 1 | 0 | 1 | – | 407.5 | |
| 0 | 0 | 1 | 1 | 0 | 0 | 0 | 1 | – | 391.5 | |
| 0 | 0 | 1 | 1 | 0 | 0 | 0 | 0 | – | 375.5 | |
| 0 | 0 | 1 | 1 | 1 | 0 | 0 | 0 | – | 359.5 | |
| 0 | 0 | 1 | 1 | 1 | 0 | 0 | 1 | – | 343.5 | |
| 0 | 0 | 1 | 1 | 1 | 1 | 0 | 1 | – | 327.5 | |
| 0 | 0 | 1 | 1 | 1 | 1 | 0 | 0 | – | 311.5 | |
| 0 | 0 | 1 | 0 | 1 | 1 | 0 | 0 | – | 295.5 | |
| 0 | 0 | 1 | 0 | 1 | 1 | 0 | 1 | – | 279.5 | |
| --- | --- | --- | --- | --- | --- | --- | --- | --- | 263.5 | --- |
| 0 | 0 | 1 | 0 | 1 | 0 | 0 | 1 | 1 | 247.5 | |
| 0 | 0 | 1 | 0 | 1 | 0 | 0 | 1 | 0 | 235.5 | |
| 0 | 0 | 1 | 0 | 1 | 0 | 0 | 0 | 1 | 227.5 | |
| 0 | 0 | 1 | 0 | 1 | 0 | 0 | 0 | 0 | 219.5 | |
| 0 | 0 | 1 | 0 | 0 | 0 | 0 | 1 | 1 | 211.5 | |
| 0 | 0 | 1 | 0 | 0 | 0 | 0 | 1 | 0 | 203.5 | |
| 0 | 0 | 1 | 0 | 0 | 0 | 0 | 0 | 1 | 195.5 | |
| 0 | 0 | 1 | 0 | 0 | 0 | 0 | 0 | 0 | 187.5 | |
| 0 | 0 | 1 | 0 | 0 | 1 | 0 | 1 | 1 | 179.5 | |
| 0 | 0 | 1 | 0 | 0 | 1 | 0 | 1 | 0 | 171.5 | |
| 0 | 0 | 1 | 0 | 0 | 1 | 0 | 0 | 1 | 163.5 | |
| 0 | 0 | 1 | 0 | 0 | 1 | 0 | 0 | 0 | 155.5 | |
| 0 | 0 | 0 | 0 | 0 | 1 | 0 | 1 | 1 | 147.5 | |
| 0 | 0 | 0 | 0 | 0 | 1 | 0 | 1 | 0 | 139.5 | |
| 0 | 0 | 0 | 0 | 0 | 1 | 0 | 0 | 1 | 131.5 | |
| 0 | 0 | 0 | 0 | 0 | 1 | 0 | 0 | 0 | 123.5 | |

Appendix I

- 13 -

L. F. Wei 41

| I8 | I7 | I6 | I5 | I4 | I3 | I2 | X1 | X0 | Amplitude of Signal Point |
|---|---|---|---|---|---|---|---|---|---|
| 0 | 0 | 0 | 0 | 0 | 0 | 0 | 1 | 1 | 115.5 |
| 0 | 0 | 0 | 0 | 0 | 0 | 0 | 1 | 0 | 109.5 |
| 0 | 0 | 0 | 0 | 0 | 0 | 0 | 0 | 1 | 105.5 |
| 0 | 0 | 0 | 0 | 0 | 0 | 0 | 0 | 0 | 101.5 |
| 0 | 0 | 0 | 0 | 1 | 0 | 0 | 1 | 1 | 97.5 |
| 0 | 0 | 0 | 0 | 1 | 0 | 0 | 1 | 0 | 93.5 |
| 0 | 0 | 0 | 0 | 1 | 0 | 0 | 0 | 1 | 89.5 |
| 0 | 0 | 0 | 0 | 1 | 0 | 0 | 0 | 0 | 85.5 |
| 0 | 0 | 0 | 0 | 1 | 1 | 0 | 1 | 1 | 81.5 |
| 0 | 0 | 0 | 0 | 1 | 1 | 0 | 1 | 0 | 77.5 |
| 0 | 0 | 0 | 0 | 1 | 1 | 0 | 0 | 1 | 73.5 |
| 0 | 0 | 0 | 0 | 1 | 1 | 0 | 0 | 0 | 69.5 |
| 0 | 0 | 0 | 1 | 1 | 1 | 0 | 1 | 1 | 65.5 |
| 0 | 0 | 0 | 1 | 1 | 1 | 0 | 1 | 0 | 61.5 |
| 0 | 0 | 0 | 1 | 1 | 1 | 0 | 0 | 1 | 57.5 |
| 0 | 0 | 0 | 1 | 1 | 1 | 0 | 0 | 0 | 53.5 |
| 0 | 0 | 0 | 1 | 1 | 0 | 0 | 1 | 1 | 46.5 |
| 0 | 0 | 0 | 1 | 1 | 0 | 0 | 1 | 0 | 42.5 |
| 0 | 0 | 0 | 1 | 1 | 0 | 0 | 0 | 1 | 38.5 |
| 0 | 0 | 0 | 1 | 1 | 0 | 0 | 0 | 0 | 34.5 |
| 0 | 0 | 0 | 1 | 0 | 0 | 0 | 1 | 1 | 30.5 |
| 0 | 0 | 0 | 1 | 0 | 0 | 0 | 1 | 0 | 26.5 |
| 0 | 0 | 0 | 1 | 0 | 0 | 0 | 0 | 1 | 22.5 |
| 0 | 0 | 0 | 1 | 0 | 0 | 0 | 0 | 0 | 18.5 |
| 0 | 0 | 0 | 1 | 0 | 1 | 0 | 1 | 1 | 14.0 |
| 0 | 0 | 0 | 1 | 0 | 1 | 0 | 1 | 0 | 10.0 |
| 0 | 0 | 0 | 1 | 0 | 1 | 0 | 0 | 1 | 6.0 |
| 0 | 0 | 0 | 1 | 0 | 1 | 0 | 0 | 0 | 2.0 |
| 0 | 0 | 0 | 1 | 0 | 1 | 1 | 1 | 1 | -2.0 |
| 0 | 0 | 0 | 1 | 0 | 1 | 1 | 1 | 0 | -6.0 |
| 0 | 0 | 0 | 1 | 0 | 1 | 1 | 0 | 1 | -10.0 |
| 0 | 0 | 0 | 1 | 0 | 1 | 1 | 0 | 0 | -14.0 |
| 0 | 0 | 0 | 1 | 0 | 0 | 1 | 1 | 1 | -18.5 |
| 0 | 0 | 0 | 1 | 0 | 0 | 1 | 1 | 0 | -22.5 |
| 0 | 0 | 0 | 1 | 0 | 0 | 1 | 0 | 1 | -26.5 |
| 0 | 0 | 0 | 1 | 0 | 0 | 1 | 0 | 0 | -30.5 |
| 0 | 0 | 0 | 1 | 1 | 0 | 1 | 1 | 1 | -34.5 |
| 0 | 0 | 0 | 1 | 1 | 0 | 1 | 1 | 0 | -38.5 |
| 0 | 0 | 0 | 1 | 1 | 0 | 1 | 0 | 1 | -42.5 |
| 0 | 0 | 0 | 1 | 1 | 0 | 1 | 0 | 0 | -46.5 |
| 0 | 0 | 0 | 1 | 1 | 1 | 1 | 1 | 1 | -53.5 |
| 0 | 0 | 0 | 1 | 1 | 1 | 1 | 1 | 0 | -57.5 |
| 0 | 0 | 0 | 1 | 1 | 1 | 1 | 0 | 1 | -61.5 |
| 0 | 0 | 0 | 1 | 1 | 1 | 1 | 0 | 0 | -65.5 |
| 0 | 0 | 0 | 0 | 1 | 1 | 1 | 1 | 1 | -69.5 |
| 0 | 0 | 0 | 0 | 1 | 1 | 1 | 1 | 0 | -73.5 |
| 0 | 0 | 0 | 0 | 1 | 1 | 1 | 0 | 1 | -77.5 |
| 0 | 0 | 0 | 0 | 1 | 1 | 1 | 0 | 0 | -81.5 |
| 0 | 0 | 0 | 0 | 1 | 0 | 1 | 1 | 1 | -85.5 |
| 0 | 0 | 0 | 0 | 1 | 0 | 1 | 1 | 0 | -89.5 |
| 0 | 0 | 0 | 0 | 1 | 0 | 1 | 0 | 1 | -93.5 |
| 0 | 0 | 0 | 0 | 1 | 0 | 1 | 0 | 0 | -97.5 |
| 0 | 0 | 0 | 0 | 0 | 0 | 1 | 1 | 1 | -101.5 |
| 0 | 0 | 0 | 0 | 0 | 0 | 1 | 1 | 0 | -105.5 |
| 0 | 0 | 0 | 0 | 0 | 0 | 1 | 0 | 1 | -109.5 |
| 0 | 0 | 0 | 0 | 0 | 0 | 1 | 0 | 0 | -115.5 |
| 0 | 0 | 0 | 0 | 0 | 1 | 1 | 1 | 1 | -123.5 |
| 0 | 0 | 0 | 0 | 0 | 1 | 1 | 1 | 0 | -131.5 |

Coded 88-PAM Inner Subconstellation

Appendix I (cont'd)

- 14 -

L. F. Wei 41

| I8 | I7 | I6 | I5 | I4 | I3 | I2 | X1 | X0 | Amplitude of Signal Point |
|---|---|---|---|---|---|---|---|---|---|
| 0 | 0 | 0 | 0 | 0 | 1 | 1 | 0 | 1 | -139.5 |
| 0 | 0 | 0 | 0 | 0 | 1 | 1 | 0 | 0 | -147.5 |
| 0 | 0 | 1 | 0 | 0 | 1 | 1 | 1 | 1 | -155.5 |
| 0 | 0 | 1 | 0 | 0 | 1 | 1 | 1 | 0 | -163.5 |
| 0 | 0 | 1 | 0 | 0 | 1 | 1 | 0 | 1 | -171.5 |
| 0 | 0 | 1 | 0 | 0 | 1 | 1 | 0 | 0 | -179.5 |
| 0 | 0 | 1 | 0 | 0 | 0 | 1 | 1 | 1 | -187.5 |
| 0 | 0 | 1 | 0 | 0 | 0 | 1 | 1 | 0 | -195.5 |
| 0 | 0 | 1 | 0 | 0 | 0 | 1 | 0 | 1 | -203.5 |
| 0 | 0 | 1 | 0 | 0 | 0 | 1 | 0 | 0 | -211.5 |
| 0 | 0 | 1 | 0 | 1 | 0 | 1 | 1 | 1 | -219.5 |
| 0 | 0 | 1 | 0 | 1 | 0 | 1 | 1 | 0 | -227.5 |
| 0 | 0 | 1 | 0 | 1 | 0 | 1 | 0 | 1 | -235.5 |
| 0 | 0 | 1 | 0 | 1 | 0 | 1 | 0 | 0 | -247.5 |

---------------------------------------------------- -263.5 --------------

| 0 | 0 | 1 | 0 | 1 | 1 | 1 | 0 | - | -279.5 |
| 0 | 0 | 1 | 0 | 1 | 1 | 1 | 1 | - | -295.5 |
| 0 | 0 | 1 | 1 | 1 | 1 | 1 | 1 | - | -311.5 |
| 0 | 0 | 1 | 1 | 1 | 1 | 1 | 0 | - | -327.5 |
| 0 | 0 | 1 | 1 | 1 | 0 | 1 | 0 | - | -343.5 |
| 0 | 0 | 1 | 1 | 1 | 0 | 1 | 1 | - | -359.5 |
| 0 | 0 | 1 | 1 | 0 | 0 | 1 | 1 | - | -375.5 |
| 0 | 0 | 1 | 1 | 0 | 0 | 1 | 0 | - | -391.5 |
| 0 | 0 | 1 | 1 | 0 | 1 | 1 | 0 | - | -407.5 |
| 0 | 0 | 1 | 1 | 0 | 1 | 1 | 1 | - | -423.5 |
| 0 | 1 | 0 | 1 | 0 | 1 | 1 | 1 | - | -439.5 |
| 0 | 1 | 0 | 1 | 0 | 1 | 1 | 0 | - | -455.5 |
| 0 | 1 | 0 | 1 | 0 | 0 | 1 | 0 | - | -471.5 |
| 0 | 1 | 0 | 1 | 0 | 0 | 1 | 1 | - | -487.5 |
| 0 | 1 | 0 | 1 | 1 | 0 | 1 | 1 | - | -511.5 |
| 0 | 1 | 0 | 1 | 1 | 0 | 1 | 0 | - | -543.5 |
| 0 | 1 | 0 | 1 | 1 | 1 | 1 | 0 | - | -575.5 |
| 0 | 1 | 0 | 1 | 1 | 1 | 1 | 1 | - | -607.5 |
| 0 | 1 | 0 | 0 | 1 | 1 | 1 | 1 | - | -639.5 |
| 0 | 1 | 0 | 0 | 1 | 1 | 1 | 0 | - | -671.5 |
| 0 | 1 | 0 | 0 | 1 | 0 | 1 | 0 | - | -703.5 |
| 0 | 1 | 0 | 0 | 1 | 0 | 1 | 1 | - | -735.5 |
| 0 | 1 | 0 | 0 | 0 | 0 | 1 | 1 | - | -767.5 |
| 0 | 1 | 0 | 0 | 0 | 0 | 1 | 0 | - | -799.5 |
| 0 | 1 | 0 | 0 | 0 | 1 | 1 | 0 | - | -831.5 |
| 0 | 1 | 0 | 0 | 0 | 1 | 1 | 1 | - | -863.5 |
| 1 | 0 | 0 | 0 | 0 | 1 | 1 | 1 | - | -895.5 |
| 1 | 0 | 0 | 0 | 0 | 1 | 1 | 0 | - | -927.5 |
| 1 | 0 | 0 | 0 | 0 | 0 | 1 | 0 | - | -959.5 |
| 1 | 0 | 0 | 0 | 0 | 0 | 1 | 1 | - | -991.5 |
| 1 | 0 | 1 | 0 | 0 | 0 | 1 | 1 | - | -1,039.5 |
| 1 | 0 | 1 | 0 | 0 | 0 | 1 | 0 | - | -1,103.5 |
| 1 | 0 | 1 | 0 | 0 | 1 | 1 | 0 | - | -1,167.5 |
| 1 | 0 | 1 | 0 | 0 | 1 | 1 | 1 | - | -1,231.5 |
| 1 | 1 | 0 | 0 | 0 | 1 | 1 | 1 | - | -1,295.5 |
| 1 | 1 | 0 | 0 | 0 | 1 | 1 | 0 | - | -1,359.5 |
| 1 | 1 | 0 | 0 | 0 | 0 | 1 | 0 | - | -1,423.5 |
| 1 | 1 | 0 | 0 | 0 | 0 | 1 | 1 | - | -1,487.5 |

Negative Portion of Uncoded 76-PAM Outer Subconstellation

Appendix I (cont'd)

L. F. Wei 41

| I8 | I7 | I6 | I5 | I4 | I2 | I1 or X1 | X | Amplitude of Signal Point | |
|---|---|---|---|---|---|---|---|---|---|
| 1 | 1 | 0 | 0 | 0 | 0 | 1 | - | 1,487.5 | |
| 1 | 1 | 0 | 0 | 0 | 0 | 1 | - | 1,423.5 x | |
| 1 | 1 | 0 | 0 | 0 | 0 | 0 | - | 1,359.5 | |
| 1 | 1 | 0 | 0 | 0 | 0 | 0 | - | 1,295.5 x | |
| 1 | 0 | 1 | 0 | 0 | 0 | 0 | - | 1,231.5 | |
| 1 | 0 | 1 | 0 | 0 | 0 | 0 | - | 1,167.5 x | |
| 1 | 0 | 1 | 0 | 0 | 0 | 1 | - | 1,103.5 | |
| 1 | 0 | 1 | 0 | 0 | 0 | 1 | - | 1,039.5 x | |
| 1 | 0 | 0 | 0 | 0 | 0 | 1 | - | 991.5 | |
| 1 | 0 | 0 | 0 | 0 | 0 | 1 | - | 959.5 x | |
| 1 | 0 | 0 | 0 | 0 | 0 | 0 | - | 927.5 | |
| 1 | 0 | 0 | 0 | 0 | 0 | 0 | - | 895.5 x | |
| 0 | 1 | 0 | 0 | 0 | 0 | 0 | - | 863.5 | |
| 0 | 1 | 0 | 0 | 0 | 0 | 0 | - | 831.5 x | |
| 0 | 1 | 0 | 0 | 0 | 0 | 1 | - | 799.5 | |
| 0 | 1 | 0 | 0 | 0 | 0 | 1 | - | 767.5 x | Positive Portion of |
| 0 | 1 | 0 | 0 | 1 | 0 | 1 | - | 735.5 | Uncoded 38/76-PAM |
| 0 | 1 | 0 | 0 | 1 | 0 | 1 | - | 703.5 x | Outer Subconstellation |
| 0 | 1 | 0 | 0 | 1 | 0 | 0 | - | 671.5 | |
| 0 | 1 | 0 | 0 | 1 | 0 | 0 | - | 639.5 x | |
| 0 | 1 | 0 | 1 | 1 | 0 | 0 | - | 607.5 | |
| 0 | 1 | 0 | 1 | 1 | 0 | 0 | - | 575.5 x | |
| 0 | 1 | 0 | 1 | 1 | 0 | 1 | - | 543.5 | |
| 0 | 1 | 0 | 1 | 1 | 0 | 1 | - | 511.5 x | |
| 0 | 1 | 0 | 1 | 0 | 0 | 1 | - | 487.5 | |
| 0 | 1 | 0 | 1 | 0 | 0 | 1 | - | 471.5 x | |
| 0 | 1 | 0 | 1 | 0 | 0 | 0 | - | 455.5 | |
| 0 | 1 | 0 | 1 | 0 | 0 | 0 | - | 439.5 x | |
| 0 | 0 | 1 | 1 | 0 | 0 | 0 | - | 423.5 | |
| 0 | 0 | 1 | 1 | 0 | 0 | 0 | - | 407.5 x | |
| 0 | 0 | 1 | 1 | 0 | 0 | 1 | - | 391.5 | |
| 0 | 0 | 1 | 1 | 0 | 0 | 1 | - | 375.5 x | |
| 0 | 0 | 1 | 1 | 1 | 0 | 1 | - | 359.5 | |
| 0 | 0 | 1 | 1 | 1 | 0 | 1 | - | 343.5 x | |
| 0 | 0 | 1 | 1 | 1 | 0 | 0 | - | 327.5 | |
| 0 | 0 | 1 | 1 | 1 | 0 | 0 | - | 311.5 x | |
| 0 | 0 | 1 | 0 | 1 | 1 | 0 | - | 295.5 | |
| 0 | 0 | 1 | 0 | 1 | 1 | 0 | - | 279.5 x | |

------------------------------------------------------------ 257.5 ------------------

| I8 | I7 | I6 | I5 | I4 | I2 | I1 or X1 | X | Amplitude of Signal Point |
|---|---|---|---|---|---|---|---|---|
| 0 | 0 | 1 | 0 | 1 | 0 | 0 | 1 | 235.5 |
| 0 | 0 | 1 | 0 | 1 | 0 | 0 | 1 | 227.5 x |
| 0 | 0 | 1 | 0 | 1 | 0 | 0 | 0 | 219.5 |
| 0 | 0 | 1 | 0 | 1 | 0 | 0 | 0 | 211.5 x |
| 0 | 0 | 1 | 0 | 0 | 0 | 1 | 1 | 203.5 |
| 0 | 0 | 1 | 0 | 0 | 0 | 1 | 1 | 195.5 x |
| 0 | 0 | 1 | 0 | 0 | 0 | 1 | 0 | 187.5 |
| 0 | 0 | 1 | 0 | 0 | 0 | 1 | 0 | 179.5 x |
| 0 | 0 | 1 | 0 | 0 | 0 | 0 | 1 | 171.5 |
| 0 | 0 | 1 | 0 | 0 | 0 | 0 | 1 | 163.5 x |
| 0 | 0 | 1 | 0 | 0 | 0 | 0 | 0 | 155.5 |
| 0 | 0 | 1 | 0 | 0 | 0 | 0 | 0 | 147.5 x |
| 0 | 0 | 0 | 0 | 0 | 0 | 1 | 1 | 139.5 |
| 0 | 0 | 0 | 0 | 0 | 0 | 1 | 1 | 131.5 x |
| 0 | 0 | 0 | 0 | 0 | 0 | 1 | 0 | 123.5 |
| 0 | 0 | 0 | 0 | 0 | 0 | 1 | 0 | 115.5 x |

Appendix II

- 16 -

L. F. Wei 41

| I8 | I7 | I6 | I5 | I4 | I2 | I1 or X1 |  | Amplitude of Signal Point |  |
|----|----|----|----|----|----|----------|---|---|---|
| 0 | 0 | 0 | 0 | 0 | 0 | 0 | 1 | 109.5 |  |
| 0 | 0 | 0 | 0 | 0 | 0 | 0 | 1 | 105.5 x |  |
| 0 | 0 | 0 | 0 | 0 | 0 | 0 | 0 | 101.5 |  |
| 0 | 0 | 0 | 0 | 0 | 0 | 0 | 0 | 97.5 x |  |
| 0 | 0 | 0 | 0 | 1 | 0 | 1 | 1 | 93.5 |  |
| 0 | 0 | 0 | 0 | 1 | 0 | 1 | 1 | 89.5 x |  |
| 0 | 0 | 0 | 0 | 1 | 0 | 1 | 0 | 85.5 |  |
| 0 | 0 | 0 | 0 | 1 | 0 | 1 | 0 | 81.5 x |  |
| 0 | 0 | 0 | 0 | 1 | 0 | 0 | 1 | 77.5 |  |
| 0 | 0 | 0 | 0 | 1 | 0 | 0 | 1 | 73.5 x |  |
| 0 | 0 | 0 | 0 | 1 | 0 | 0 | 0 | 69.5 |  |
| 0 | 0 | 0 | 0 | 1 | 0 | 0 | 0 | 65.5 x |  |
| 0 | 0 | 0 | 1 | 1 | 0 | 1 | 1 | 61.5 |  |
| 0 | 0 | 0 | 1 | 1 | 0 | 1 | 1 | 57.5 x |  |
| 0 | 0 | 0 | 1 | 1 | 0 | 1 | 0 | 46.5 |  |
| 0 | 0 | 0 | 1 | 1 | 0 | 1 | 0 | 44.5 x |  |
| 0 | 0 | 0 | 1 | 1 | 0 | 0 | 1 | 38.5 |  |
| 0 | 0 | 0 | 1 | 1 | 0 | 0 | 1 | 36.5 x |  |
| 0 | 0 | 0 | 1 | 1 | 0 | 0 | 0 | 30.5 |  |
| 0 | 0 | 0 | 1 | 1 | 0 | 0 | 0 | 28.5 x |  |
| 0 | 0 | 0 | 1 | 0 | 0 | 1 | 1 | 22.5 |  |
| 0 | 0 | 0 | 1 | 0 | 0 | 1 | 1 | 20.5 x |  |
| 0 | 0 | 0 | 1 | 0 | 0 | 1 | 0 | 15.0 |  |
| 0 | 0 | 0 | 1 | 0 | 0 | 1 | 0 | 14.0 x |  |
| 0 | 0 | 0 | 1 | 0 | 0 | 0 | 1 | 9.0 |  |
| 0 | 0 | 0 | 1 | 0 | 0 | 0 | 1 | 8.0 x |  |
| 0 | 0 | 0 | 1 | 0 | 0 | 0 | 0 | 3.0 |  |
| 0 | 0 | 0 | 1 | 0 | 0 | 0 | 0 | 2.0 x | Coded 44/88-PAM Inner Subconstellation |
| 0 | 0 | 0 | 1 | 0 | 1 | 1 | 1 | -2.0 x |  |
| 0 | 0 | 0 | 1 | 0 | 1 | 1 | 1 | -3.0 |  |
| 0 | 0 | 0 | 1 | 0 | 1 | 1 | 0 | -8.0 x |  |
| 0 | 0 | 0 | 1 | 0 | 1 | 1 | 0 | -9.0 |  |
| 0 | 0 | 0 | 1 | 0 | 1 | 0 | 1 | -14.0 x |  |
| 0 | 0 | 0 | 1 | 0 | 1 | 0 | 1 | -15.0 |  |
| 0 | 0 | 0 | 1 | 0 | 1 | 0 | 0 | -20.5 x |  |
| 0 | 0 | 0 | 1 | 0 | 1 | 0 | 0 | -22.5 |  |
| 0 | 0 | 0 | 1 | 1 | 1 | 1 | 1 | -28.5 x |  |
| 0 | 0 | 0 | 1 | 1 | 1 | 1 | 1 | -30.5 |  |
| 0 | 0 | 0 | 1 | 1 | 1 | 1 | 0 | -36.5 x |  |
| 0 | 0 | 0 | 1 | 1 | 1 | 1 | 0 | -38.5 |  |
| 0 | 0 | 0 | 1 | 1 | 1 | 0 | 1 | -44.5 x |  |
| 0 | 0 | 0 | 1 | 1 | 1 | 0 | 1 | -46.5 |  |
| 0 | 0 | 0 | 1 | 1 | 1 | 0 | 0 | -57.5 x |  |
| 0 | 0 | 0 | 1 | 1 | 1 | 0 | 0 | -61.5 |  |
| 0 | 0 | 0 | 0 | 1 | 1 | 1 | 1 | -65.5 x |  |
| 0 | 0 | 0 | 0 | 1 | 1 | 1 | 1 | -69.5 |  |
| 0 | 0 | 0 | 0 | 1 | 1 | 1 | 0 | -73.5 x |  |
| 0 | 0 | 0 | 0 | 1 | 1 | 1 | 0 | -77.5 |  |
| 0 | 0 | 0 | 0 | 1 | 1 | 0 | 1 | -81.5 x |  |
| 0 | 0 | 0 | 0 | 1 | 1 | 0 | 1 | -85.5 |  |
| 0 | 0 | 0 | 0 | 1 | 1 | 0 | 0 | -89.5 x |  |
| 0 | 0 | 0 | 0 | 1 | 1 | 0 | 0 | -93.5 |  |
| 0 | 0 | 0 | 0 | 0 | 1 | 1 | 1 | -97.5 x |  |
| 0 | 0 | 0 | 0 | 0 | 1 | 1 | 1 | -101.5 |  |
| 0 | 0 | 0 | 0 | 0 | 1 | 1 | 0 | -105.5 x |  |
| 0 | 0 | 0 | 0 | 0 | 1 | 1 | 0 | -109.5 |  |
| 0 | 0 | 0 | 0 | 0 | 1 | 0 | 1 | -115.5 x |  |
| 0 | 0 | 0 | 0 | 0 | 1 | 0 | 1 | -123.5 |  |

Appendix II (cont'd)

L. F. Wei 41

| I8 | I7 | I6 | I5 | I4 | I2 | I1 or X1 | X | Amplitude of Signal Point | |
|----|----|----|----|----|----|----------|---|---------------------------|---|
| 0 | 0 | 0 | 0 | 0 | 1 | 0 | 0 | -131.5 x | |
| 0 | 0 | 0 | 0 | 0 | 1 | 0 | 0 | -139.5 | |
| 0 | 0 | 1 | 0 | 0 | 1 | 1 | 1 | -147.5 x | |
| 0 | 0 | 1 | 0 | 0 | 1 | 1 | 1 | -155.5 | |
| 0 | 0 | 1 | 0 | 0 | 1 | 1 | 0 | -163.5 x | |
| 0 | 0 | 1 | 0 | 0 | 1 | 1 | 0 | -171.5 | |
| 0 | 0 | 1 | 0 | 0 | 1 | 0 | 1 | -179.5 x | |
| 0 | 0 | 1 | 0 | 0 | 1 | 0 | 1 | -187.5 | |
| 0 | 0 | 1 | 0 | 0 | 1 | 0 | 0 | -195.5 x | |
| 0 | 0 | 1 | 0 | 0 | 1 | 0 | 0 | -203.5 | |
| 0 | 0 | 1 | 0 | 1 | 0 | 1 | 1 | -211.5 x | |
| 0 | 0 | 1 | 0 | 1 | 0 | 1 | 1 | -219.5 | |
| 0 | 0 | 1 | 0 | 1 | 0 | 1 | 0 | -227.5 x | |
| 0 | 0 | 1 | 0 | 1 | 0 | 1 | 0 | -235.5 | |
| | | | | | | | | -257.5 | |
| 0 | 0 | 1 | 0 | 1 | 1 | 1 | - | -279.5 x | |
| 0 | 0 | 1 | 0 | 1 | 1 | 1 | - | -295.5 | |
| 0 | 0 | 1 | 1 | 1 | 1 | 1 | - | -311.5 x | |
| 0 | 0 | 1 | 1 | 1 | 1 | 1 | - | -327.5 | |
| 0 | 0 | 1 | 1 | 1 | 1 | 0 | - | -343.5 x | |
| 0 | 0 | 1 | 1 | 1 | 1 | 0 | - | -359.5 | |
| 0 | 0 | 1 | 1 | 0 | 1 | 0 | - | -375.5 x | |
| 0 | 0 | 1 | 1 | 0 | 1 | 0 | - | -391.5 | |
| 0 | 0 | 1 | 1 | 0 | 1 | 1 | - | -407.5 x | |
| 0 | 0 | 1 | 1 | 0 | 1 | 1 | - | -423.5 | |
| 0 | 1 | 0 | 1 | 0 | 1 | 1 | - | -439.5 x | |
| 0 | 1 | 0 | 1 | 0 | 1 | 1 | - | -455.5 | |
| 0 | 1 | 0 | 1 | 0 | 1 | 0 | - | -471.5 x | |
| 0 | 1 | 0 | 1 | 0 | 1 | 0 | - | -487.5 | |
| 0 | 1 | 0 | 1 | 1 | 1 | 0 | - | -511.5 x | |
| 0 | 1 | 0 | 1 | 1 | 1 | 0 | - | -543.5 | |
| 0 | 1 | 0 | 1 | 1 | 1 | 1 | - | -575.5 x | |
| 0 | 1 | 0 | 1 | 1 | 1 | 1 | - | -607.5 | |
| 0 | 1 | 0 | 0 | 1 | 1 | 1 | - | -639.5 x | |
| 0 | 1 | 0 | 0 | 1 | 1 | 1 | - | -671.5 | |
| 0 | 1 | 0 | 0 | 1 | 1 | 0 | - | -703.5 x | Negative Portion of |
| 0 | 1 | 0 | 0 | 1 | 1 | 0 | - | -735.5 | Uncoded 38/76-PAM |
| 0 | 1 | 0 | 0 | 1 | 0 | 0 | - | -767.5 x | Outer Subconctellation |
| 0 | 1 | 0 | 0 | 1 | 0 | 0 | - | -799.5 | |
| 0 | 1 | 0 | 0 | 1 | 0 | 1 | - | -831.5 x | |
| 0 | 1 | 0 | 0 | 1 | 0 | 1 | - | -863.5 | |
| 1 | 0 | 0 | 0 | 0 | 1 | 1 | - | -895.5 x | |
| 1 | 0 | 0 | 0 | 0 | 1 | 1 | - | -927.5 | |
| 1 | 0 | 0 | 0 | 0 | 1 | 0 | - | -959.5 x | |
| 1 | 0 | 0 | 0 | 0 | 1 | 0 | - | -991.5 | |
| 1 | 0 | 1 | 0 | 0 | 1 | 0 | - | -1,039.5 x | |
| 1 | 0 | 1 | 0 | 0 | 1 | 0 | - | -1,103.5 | |
| 1 | 0 | 1 | 0 | 0 | 1 | 1 | - | -1,167.5 x | |
| 1 | 0 | 1 | 0 | 0 | 1 | 1 | - | -1,231.5 | |
| 1 | 1 | 0 | 0 | 0 | 1 | 1 | - | -1,295.5 x | |
| 1 | 1 | 0 | 0 | 0 | 1 | 1 | - | -1,359.5 | |
| 1 | 1 | 0 | 0 | 0 | 1 | 0 | - | -1,423.5 x | |
| 1 | 1 | 0 | 0 | 0 | 1 | 0 | - | -1,487.5 | |

Appendix II (cont'd)

- 18 -

L. F. Wei 41

| I8 | I7 | I6 | I5 | I4 | I1 | Amplitude of Signal Point | |
|----|----|----|----|----|----|---------|---|
| 1 | 1 | 0 | 0 | 0 | 0 | 927.5 | |
| 1 | 1 | 0 | 0 | 0 | 0 | 895.5 | x |
| 1 | 0 | 1 | 0 | 0 | 0 | 863.5 | |
| 1 | 0 | 1 | 0 | 0 | 0 | 831.5 | x |
| 1 | 0 | 0 | 0 | 0 | 0 | 799.5 | |
| 1 | 0 | 0 | 0 | 0 | 0 | 767.5 | x |
| 0 | 1 | 0 | 0 | 0 | 0 | 735.5 | |
| 0 | 1 | 0 | 0 | 0 | 0 | 703.5 | x |
| 0 | 1 | 0 | 0 | 1 | 0 | 671.5 | |
| 0 | 1 | 0 | 0 | 1 | 0 | 639.5 | x |
| 0 | 1 | 0 | 1 | 1 | 0 | 607.5 | |
| 0 | 1 | 0 | 1 | 1 | 0 | 575.5 | x |
| 0 | 1 | 0 | 1 | 0 | 0 | 543.5 | |
| 0 | 1 | 0 | 1 | 0 | 0 | 511.5 | x |
| 0 | 0 | 0 | 1 | 0 | 0 | 487.5 | |
| 0 | 0 | 0 | 1 | 0 | 0 | 471.5 | x |
| 0 | 0 | 0 | 1 | 1 | 0 | 455.5 | |
| 0 | 0 | 0 | 1 | 1 | 0 | 439.5 | x |
| 0 | 0 | 0 | 0 | 1 | 0 | 423.5 | |
| 0 | 0 | 0 | 0 | 1 | 0 | 407.5 | x |
| 0 | 0 | 0 | 0 | 0 | 0 | 391.5 | |
| 0 | 0 | 0 | 0 | 0 | 0 | 375.5 | x |
| 0 | 0 | 1 | 0 | 0 | 0 | 359.5 | |
| 0 | 0 | 1 | 0 | 0 | 0 | 343.5 | x |
| 0 | 0 | 1 | 0 | 1 | 0 | 327.5 | |
| 0 | 0 | 1 | 0 | 1 | 0 | 311.5 | x |
| 0 | 0 | 1 | 1 | 1 | 0 | 295.5 | |
| 0 | 0 | 1 | 1 | 1 | 0 | 279.5 | x |
| 0 | 0 | 1 | 1 | 0 | 0 | 263.5 | |
| 0 | 0 | 1 | 1 | 0 | 0 | 247.5 | x |
| 0 | 0 | 1 | 1 | 0 | 1 | -247.5 | x |
| 0 | 0 | 1 | 1 | 0 | 1 | -263.5 | |
| 0 | 0 | 1 | 1 | 1 | 1 | -279.5 | x |
| 0 | 0 | 1 | 1 | 1 | 1 | -295.5 | |
| 0 | 0 | 1 | 0 | 1 | 1 | -311.5 | x |
| 0 | 0 | 1 | 0 | 1 | 1 | -327.5 | |
| 0 | 0 | 1 | 0 | 0 | 1 | -343.5 | x |
| 0 | 0 | 1 | 0 | 0 | 1 | -359.5 | |
| 0 | 0 | 0 | 0 | 0 | 1 | -375.5 | x |
| 0 | 0 | 0 | 0 | 0 | 1 | -391.5 | |
| 0 | 0 | 0 | 0 | 1 | 1 | -407.5 | x |
| 0 | 0 | 0 | 0 | 1 | 1 | -423.5 | |
| 0 | 0 | 0 | 1 | 1 | 1 | -439.5 | x |
| 0 | 0 | 0 | 1 | 1 | 1 | -455.5 | |
| 0 | 0 | 0 | 1 | 0 | 1 | -471.5 | x |
| 0 | 0 | 0 | 1 | 0 | 1 | -487.5 | |
| 0 | 1 | 0 | 1 | 0 | 1 | -511.5 | x |
| 0 | 1 | 0 | 1 | 0 | 1 | -543.5 | |
| 0 | 1 | 0 | 1 | 1 | 1 | -575.5 | x |
| 0 | 1 | 0 | 1 | 1 | 1 | -607.5 | |
| 0 | 1 | 0 | 0 | 1 | 1 | -639.5 | x |
| 0 | 1 | 0 | 0 | 1 | 1 | -671.5 | |
| 0 | 1 | 0 | 0 | 0 | 1 | -703.5 | x |
| 0 | 1 | 0 | 0 | 0 | 1 | -735.5 | |
| 1 | 0 | 0 | 0 | 0 | 1 | -767.5 | x |
| 1 | 0 | 0 | 0 | 0 | 1 | -799.5 | |
| 1 | 0 | 1 | 0 | 0 | 1 | -831.5 | x |
| 1 | 0 | 1 | 0 | 0 | 1 | -863.5 | |
| 1 | 1 | 0 | 0 | 0 | 1 | -895.5 | x |
| 1 | 1 | 0 | 0 | 0 | 1 | -927.5 | |

Uncoded 30/60-PAM Constellation

Appendix III

- 19 -

The invention claimed is:

1. A maximum-likelihood decoding method for decoding a stream of signal points, a first plurality of said signal points having been generated using a predetermined code defined by a state transition diagram and a second plurality of said signal points having been generated not using said predetermined code, said method comprising the steps of
   a) maintaining path metrics respectively associated with at least ones of the states of said code,
   b) responsive to each received first plurality signal point, generating for each of said ones of said states, a branch metric associated with each next state to which said each state is connected by a particular branch in the state transition diagram, and computing an updated path metric for at least ones of said states based on their associated path metrics and the generated branch metrics, and
   c) responsive to each received second plurality signal point, generating for each of said ones of said states a branch metric associated only with that particular state, and computing an updated path metric for at least ones of said states based on the existing path metrics and the generated branch metrics.

2. The invention of claim 1 wherein said first plurality signal points are representative of signal points of a first signal constellation, wherein each of the branches of said state transition diagram is associated with a respective subset of said first signal constellation and wherein in step b) each said branch metric is a function of the distance within said constellation between said each received first plurality signal point and the subset associated with each said particular branch.

3. The invention of claims 1 or 2 wherein said second plurality signal points are signal points of a second signal constellation, and wherein in step c) said branch metric is a function of the distance in said second signal constellation between said each received second plurality signal point and the nearest signal point of said second signal constellation.

4. The invention of claim 3 wherein said first and second signal constellations are respective sub-constellations of an overall signal constellation.

5. The invention of claim 3 comprising the further step of forming decisions as to values of said stream of signal points in response to the updated path metrics.

6. A method for use in a Viterbi decoder for decoding a stream of signal points corrupted by intersymbol interference, the method comprising the steps of
   a) generating in response to each received signal point a plurality of equalized signal points, each equalized signal point being generated as a function of a respective estimate of the intersymbol interference component of said each received signal point, each estimate being a function of a respective present surviving path of said Viterbi decoder,
   b) generating updated surviving paths for said Viterbi decoder as a function of the set of equalized signal points, and
   c) forming a decision as to a particular one of the signal points of said stream as a function at least of a particular one of the updated surviving paths,
   a first plurality of said signal points having been generated using a particular trellis code and a second plurality of said signal points having been generated elsewise.

7. The invention of claim 6 wherein in step a) said each estimate is formed by a decision feedback equalizer which utilizes as its input decisions tentatative decisions as to the values of said stream of signal points which lie along the respective present surviving path.

8. The invention of claim 6 wherein each of said present surviving paths has an associated metric and wherein step b) comprises the steps of
   generating a path metric for each of a plurality of candidate paths, each candidate path comprising a respective one of the present surviving paths extended from its respective terminating state of the trellis code i) along a branch of the trellis code state transition diagram, if said received signal point is one of said first plurality signal points, or ii) to that same state, if said received signal point is one of said second plurality signal points, and
   selecting ones of the candidate paths to be said updated surviving paths, said selecting being in response to the path metrics generated for the candidate paths.

9. A method for decoding a stream of signal points, a first plurality of said signal points having been generated using a predetermined trellis code defined by a state transition diagram, a second plurality of said signal points having been generated not using said predetermined code, said method comprising the steps of
   maintaining a path metric associated with each of a plurality of surviving paths through the code trellis, each of said surviving paths terminating on a respective state of the code,
   responsive to a received one of said signal points, generating an updated path metric for each of a plurality of candidate paths, each candidate path comprising a respective one of the surviving paths extended from the respective terminating state a) along a branch of said state transition diagram, if said received signal point is one of said first plurality signal point, or b) to that same state, if said received signal point is one of said second plurality signal points,
   identifying new surviving paths from the candidate paths as a function of the updated path metrics, and
   forming a decision as to the value of a previously received one of said signal points as a function of at least one of said new surviving paths.

* * * * *